July 25, 1933.  H. A. GILLIES  1,920,010
FRICTION BRAKE
Filed Sept. 5, 1931
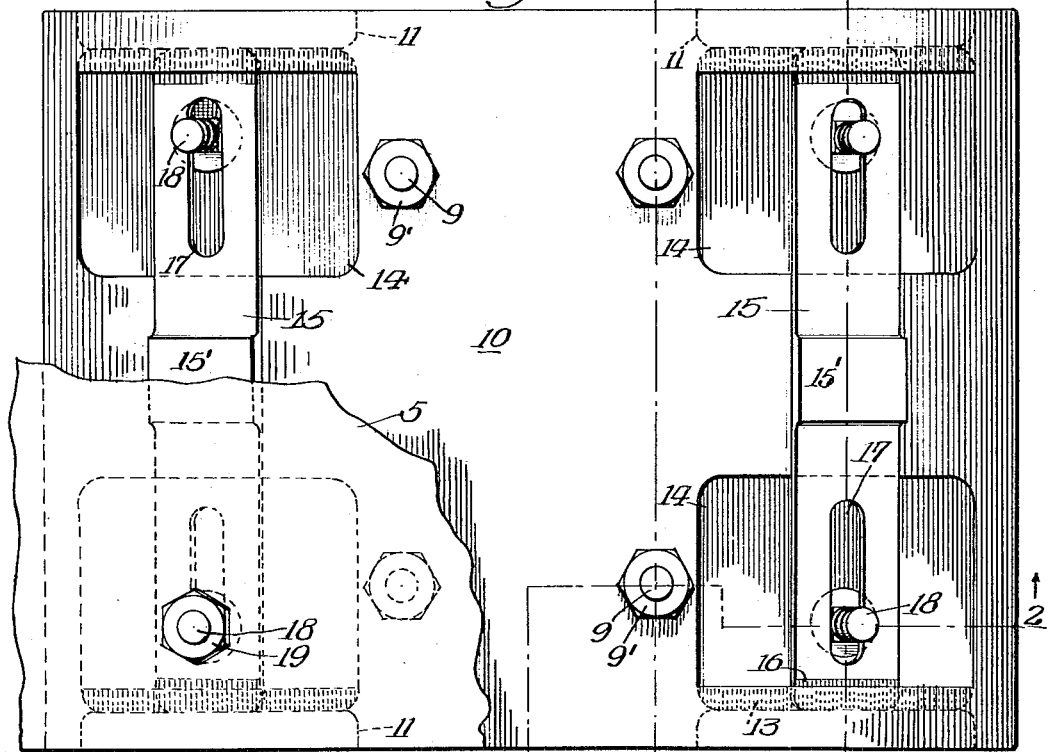
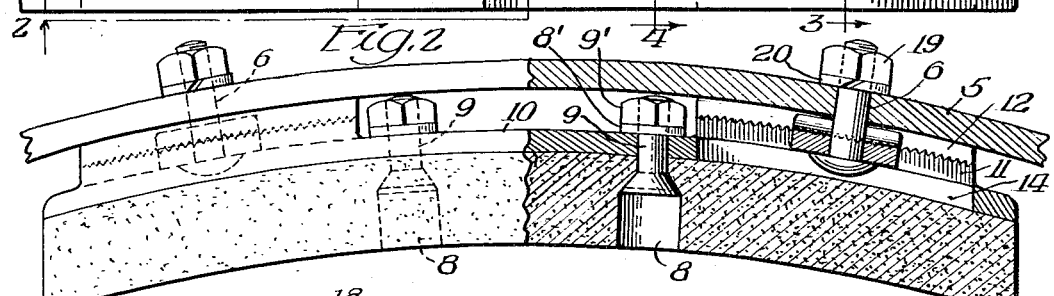
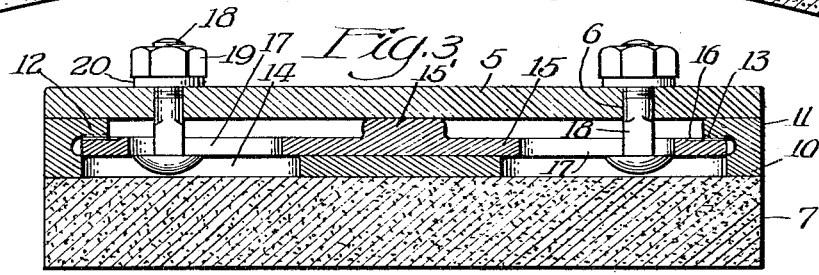
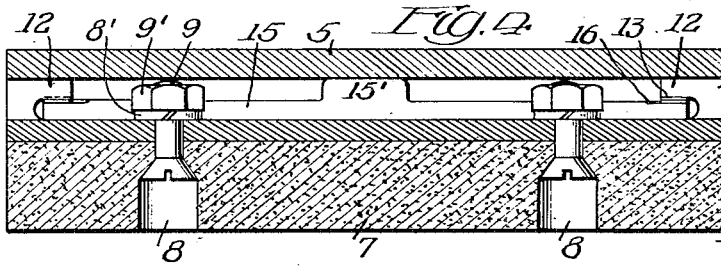
Inventor
Hugh A. Gillies
By Wm. O. Belt
Atty.

Patented July 25, 1933

1,920,010

UNITED STATES PATENT OFFICE

HUGH A. GILLIES, OF DETROIT, MICHIGAN, ASSIGNOR TO AMERICAN BRAKEBLOK CORPORATION, OF NEW YORK, N. Y., A CORPORATION OF NEW YORK

FRICTION BRAKE

Application filed September 5, 1931. Serial No. 561,376.

This invention relates to friction brakes and more particularly to novel means for securing friction elements on the brake bands of industrial equipment and the like.

It is common practice to provide spaced openings in the band or other carrier or support and correspondingly spaced openings in the friction elements to receive the fastening devices whereby the friction elements are mounted on and secured to the band. If the openings in the band do not correspond with those in the friction element, it is necessary to make new openings in the band and this is objectionable because it weakens the band. It is the primary object of my invention to provide the friction element with adjustable attaching means to enable the fastening devices to be registered with openings in the band variously located within sufficient limits so that a friction element may readily be mounted on and secured to the band without the necessity of making additional openings therein.

Other objects of the invention are to provide attaching devices of simple construction, which can be readily applied and operated, which will permit removal and replacement of friction elements readily, and which may be adjusted longitudinally and transversely for use on bands having openings of a wide variety of spacing therein.

In the accompanying drawing I have illustrated a selected embodiment of the invention and referring thereto Fig. 1 is a plan view in which the band is partly broken away;

Fig. 2 is a view on the line 2—2 of Fig. 1;

Fig. 3 is a view on the line 3—3 of Fig 1; and

Fig. 4 is a view on the line 4—4 of Fig. 1.

Referring to the drawing, 5 represents a brake band which is provided with openings 6 to receive the fastening devices whereby the friction element 7 is secured thereto. In order that the fastening devices may be disposed on the friction element in a position to register with variously located openings in the band, I provide adjustable attaching means on the friction element which carry the fastening devices and thereby enable these devices to be changed in position as required to register with the openings already in the band. I use the term "band" herein in a generic sense to include any kind of support or carrier on which a friction element is or may be mounted and secured within the capabilities of my invention. I have shown a friction element in the form of a block 7 of molded non-compressible heat-resisting material but I do not restrict the invention to this particular type of friction element but reserve the right to use it with any type of friction element for which it is or may be adapted. The block 7 has openings 8 to receive bolts 9 for securing the block rigidly to the back 10. The threaded ends of the bolts are preferably located on the outside of the back to receive the lock washers 8' and nuts 9' which will be located between the back 10 and the band 5 and protected thereby. The back is provided at its side edges with spaced lugs 11 and inwardly directed lips 12 which are serrated at 13 on their inner faces. Clearance recesses 14 are provided in the back opposite the lugs 11. Transverse straps 15 extend across the back and beneath the lips 12 and their outer faces are serrated at 16 to engage the serrated inner faces of the lips. The lips have projections 15' intermediate their ends to form a bearing against the band 5. Elongated slots 17 are provided in the straps 15 to receive the fastening bolts 18 which have their heads arranged in the clearance recesses 14 and their shanks extended through the slots 17 and the openings 6 in the band. The straps are capable of adjustment lengthwise of the friction element and the bolts 18 are capable of adjustment transversely of the friction element to position the bolts for registration with the openings in the band, and this adjustment makes it possible to adapt the friction element for bands having openings variously disposed. These bolts 18 are provided with nuts 19 and lock washers 20 which are located on the outer side of the band where they are readily accessible. My invention enables a friction element to be mounted on bands having fastening openings therein variously disposed so that it becomes necessary to provide new openings and weakening of the band is thereby avoided. The attaching bolts being capable of universal adjustment on the friction element enables them to be positioned to engage openings in the band which may vary in position within wide limits. My invention enables a friction element to be used in replacement of friction elements of many different varieties and on bands or other supports or carriers of many different kinds without the necessity of making new openings in the bands, and this not only avoids the necessity for making new openings in the band but the loss of time and expense of doing so. It sometimes happens that friction elements made for replacement of the same kind of friction elements will not exactly fit so that the fastening bolts will readily enter the openings in the band and sometimes they are forced into place with damage to parts which may result in an imperfect installation and inefficiency results. My invention simplifies the operation of installing friction elements on a band and insures that they will be properly and rigidly mounted and secured in place without damage to any parts.

While I have illustrated and described a preferred form of construction for my invention it is to be understood that this is capable of variation and modification and I therefore do not wish to be limited to the precise details set forth but desire to avail myself of such changes and alterations as fall within the scope of the following claims.

I claim:

1. In a friction brake embodying a band, a friction element, and universally adjustable means for attaching the friction element to the band.

2. In a friction brake embodying a band having openings therein, a friction element, devices for fastening the friction element to the band, and means affording longitudinal adjustment of the fastening devices to effect registration with said openings.

3. In a friction brake embodying a band having openings therein, a friction element, devices for fastening the friction element to the band, and means affording transverse adjustment of the fastening devices to effect registration with said openings.

4. In a friction brake embodying a band having openings therein, a friction element, devices for fastening the friction element to the band, and means affording longitudinal and transverse adjustment of the fastening devices to effect registration with said openings.

5. In a friction brake embodying a band having openings therein, a friction element, attachment devices on said friction element and having slots therein, and fastening devices extending through said slots and engaging said openings to secure said friction element to said band.

6. In a friction brake embodying a band having openings therein, a friction element having lugs thereon, attachment devices engaging said lugs and having slots therein, and fastening devices extending through said slots and engaging said openings to secure said friction element to said band.

7. In a friction brake embodying a band having openings therein, a friction element, attachment devices engaged with said friction element and having slots therein, means affording longitudinal adjustment of said attachment devices relative to said band and friction element, and means extending through said slots and engaging said openings for securing said friction element to said band.

8. In a friction brake embodying a band having openings therein, a friction element comprising a back, attachment devices engaged with and adjustable longitudinally of said back and having slots therein, and means extending through said slots and engaging said openings for securing said friction element to said band.

9. In a friction brake embodying a band having openings therein, a friction element comprising a back, transverse straps engaged with and longitudinally adjustable of said back and having slots therein, and attaching means extending through said slots and engaging said openings for connecting said back and friction element to said band.

10. A friction brake including a band having openings therein, a friction element comprising a back, longitudinally extending lugs on said back, transverse straps having their ends engaged with said lugs and provided with slots, and means extending through said slots and engaging said openings for securing said friction element to said band.

11. A friction brake including a band having openings therein, a friction element, a reenforcing back for said friction element, means connecting said friction element to said back, longitudinally extending lugs on said back and having serrations thereon, adapting straps having serrations at the ends thereof engageable with the serrations on said lugs whereby said straps may be adjusted longitudinally of said back, said straps having elongated slots therein, and attaching means extended through said slots and openings for rigidly connecting said back and friction element to said band.

12. A friction brake embodying a band having openings therein, a friction element, a reenforcing back for said element, means connecting said friction element to said back, longitudinally extending lugs on said back and having lips thereon overhanging the adjacent portion of said back and element, said back having recesses therein adjacent said lips, said lips having serrations thereon, adapting straps having serrations at the ends thereof engageable with the serrations on said lips, said straps having elongated slots therein, and attaching means extending through said slots and engaging said openings for connecting said reenforcing back and friction element to said band.

HUGH A. GILLIES.